T. N. FLETCHER.
COMBINED MILKING MACHINE RELEASER AND PULSATOR.
APPLICATION FILED JAN. 5, 1917.
1,228,894.
Patented June 5, 1917.
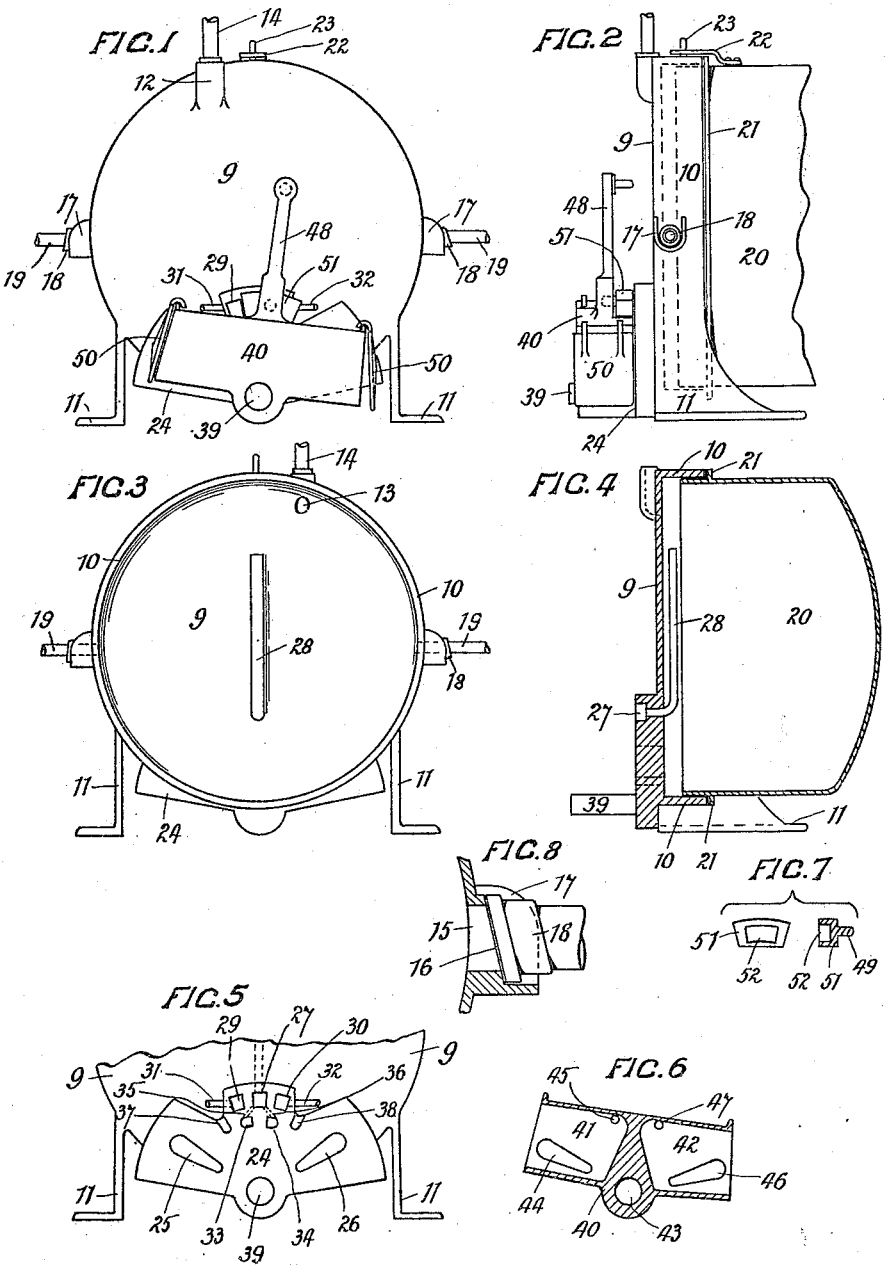
INVENTOR:
T. N. FLETCHER.
BY: *[signature]*
ATTORNEY.

UNITED STATES PATENT OFFICE.

THOMAS NOTON FLETCHER, OF HAMILTON, NEW ZEALAND.

COMBINED MILKING-MACHINE RELEASER AND PULSATOR.

1,228,894.  Specification of Letters Patent.  Patented June 5, 1917.

Application filed January 5, 1917. Serial No. 140,718.

*To all whom it may concern:*

Be it known that I, THOMAS NOTON FLETCHER, a subject of the King of Great Britain, residing at Hamilton, New Zealand, have invented a new and useful Improvement in Combined Milking-Machine Releasers and Pulsators; and I do hereby declare the following to be a full, clear, and exact description of the same.

This invention has been devised in order to provide improvements in the construction of milking machine releasers of that type in which a receiving chamber is employed to receive the milk and from which the milk is delivered by discharging chambers working on the receiver. It also embodies improvements in the construction and working of the releaser by which the discharging chambers are adapted to be worked reciprocally across discharge openings in the receiver so as to connect with such receiver and with the vacuum system of the machine alternately with a break in the connection with the receiver and a connection with the atmosphere and in the combination therewith of improved means for pulsating the teat cups or other parts of the milking installation.

The principal object of the invention is to provide for the easy cleansing of the several parts of the releaser without having to break the connections with the milk and vacuum mains. With all releasers of this type hitherto constructed these connections are made to enter the receiving chamber proper, so that when the releaser has to be taken apart for cleansing, the connections have to be broken.

Other objects of the invention are to provide for an improved construction of the discharging chambers and pulsator appliances and also to provide for improved joints for readily connecting up the milk and vacuum mains to the releaser.

The invention will be described in detail with reference to the accompanying sheet of drawings, in which:—

Figure 1 is a front elevation of the apparatus.

Fig. 2 is a side elevation thereof.

Fig. 3 is a back elevation of the head or cover for the receiving chamber.

Fig. 4 is a sectional elevation thereof with the chamber in position therein.

Fig. 5 is a front elevation of the valve face of the receiver cover upon which the discharging vessels and pulsator slide valve work and showing the arrangement of the various milk, vacuum and air ports therein.

Fig. 6 is a longitudinal section through the discharging vessels.

Figs. 7 are detail views of the pulsator slide valve.

Fig. 8 is a sectional detail of the joint between the milk receiver and the milk mains.

In carrying out the invention a head or cover 9 made of metal and preferably of circular form is provided and formed with a flange 10 extending rearwardly all around its periphery, and with feet or stands 11 to support it in a rigid position. It is provided with a boss 12 on its front having a passage 13 passing through to its inside and which boss is adapted to have the vacuum pipe connection 14 screwed into it. It is also provided with a passage 15 passing through its flange 10 horizontally at the side thereof and with a beveled face 16 at its outer end that is arranged within a bracket 17 that is semi-circular in shape at its lower side. This bracket is designed to receive and support a pipe end 18 upon the milk pipe 19, the face of which end is shaped with a corresponding bevel to the face 16 in order that the milk pipe by its own weight will make a close airtight connection with the passage 15 leading to the inside of the head or cover as shown in Fig. 8. This manner of making the pipe connection will allow for the pipe being readily lifted or replaced, as no securing means will be required to make the connection. These parts may be duplicated on the other side of the head or cover, as shown in the drawings, in order that milk may be drawn into the receiver from both sides and the releaser thereby may be placed at a central point within the installation.

Combined with this head or cover is the milk receiving vessel 20 made of any desired capacity with one end open and formed of such a size and shape as to fit neatly within the flange 10 of such head or cover. It is also provided with a rim 21 extending all around it a short distance back from such open end which rim is adapted to engage with the edge of the flange 10 when the end of the vessel is inserted therein, as shown in Fig. 4. The vessel is kept in this position by means of a lug 22 on its edge which is adapted to hook on to a peg 23 projecting from the top of the head 9, so that the vessel thus hangs by its weight upon such peg and makes contact between the rim 21 and flange 10. A rubber or like ring surrounds the outer face of this rim so that a proper airtight contact is effected.

It will thus be seen that when the vessel 20 is in position upon the head, its inside will be brought under the action of the vacuum through the connection 14 so that milk will collect therein in the same manner as with an ordinary releaser through the connection or connections 19.

When the releaser is to be cleaned, the receiver may be readily lifted out of the head, when all the parts may be easily reached, and after cleaning, the receiver may be easily and quickly replaced in position, without any interference at all with the milk and vacuum connections.

The head or cover 9 is also formed with a vertical valve face 24 extending across the width of its lower portion. At points near each end of such valve face are ports 25 and 26 respectively, which are hereinafter referred to as the milk discharge ports, and which open through to the inside of the milk receiver 20. The central portion of the valve face is made with a set of three small chambers opening through ports to the surface of the valve face. The middle one of these 27 is connected by means of the pipe 28 (Figs. 3 and 4) with the inside of the head or cover, such pipe passing vertically upward to above the level attained by the milk that may collect in the vessel 20, so that this central port is in constant communication with the vacuum source acting through such vessel when the apparatus is working. The respective outer chambers 29 and 30 are furnished with pipes 31 and 32 leading away therefrom and to the apparatus to be pulsated, for instance, the teat cups of the milking installation.

Below these chambers, two ports 33 and 34 are formed in the surface of the valve face. These ports are in communication with the central vacuum chamber 27 above by means of passages 35 and 36 extending beneath the surface of the valve face and indicated by the dotted lines in Fig. 5. Thus these ports are also constantly in communication with the vacuum source.

Formed in the valve face between the discharge port 25 and the port 29 is an air groove 37 running radially inward from the edge of the valve face for a short distance. A similar air groove 38 is formed in the valve face between the discharge port 26 and port 30.

A spindle 39 projects from the valve face at its lower end, and the set of ports 27, 29 and 30, and the ports 33 and 34 with the groove ends 37 and 38 are arranged in respective arcs around the spindle.

The discharging vessels are formed by a two chambered casting 40 having the two chambers 41 and 42 arranged on opposite sides of a central bearing 43 that fits on to the spindle 39 so that the casting may be rocked thereon. The inner wall of the casting is made smooth so that it makes an airtight joint with the surface of the valve face 24. Each chamber opens at its outer end and is furnished with a flap cover 50 (Figs. 1 and 2), adapted to make an airtight closure therewith that is swung upon the top edge of the opening.

The inner wall of the compartment 41 is pierced with a port 44 (see Fig. 6) near its bottom and with a small aperture 45 near its top and these are so positioned that when that end of the casting is raised, the port 44 will coincide with the discharge port 25 of the valve face 24, and the aperture 45 with the vacuum port 33 in the valve face. When such compartment is lowered, connection will be broken between the ports 44 and 25 and connection established between the aperture 45 and the air groove 37. Likewise the compartment 42 is made with its back wall formed with a port 46 and an aperture 47 the former of which is positioned to make and break connection with the discharge port 26 while the latter is positioned to make connection with the vacuum port 34 and air groove 38, when that end of the discharging vessel is in the raised and lowered positions. The two compartments are arranged to work alternately by being reciprocally rocked on the spindle 39 and thus through the provision of the several ports described, to be placed alternately into connection with the receiving vessel 20 and the vacuum source, and to have such connections broken and a connection with air made, in reverse order to one another.

Consequently the compartment for the time being in the raised position will be exhausted of its air so that its flap cover 50, which closes automatically through its own weight, will make an airtight sealing on its seat and thus the milk will flow from the receiving vessel into such compartment. Then when such compartment is lowered (raising the other into the position and connections to receive the milk) it will be cut off from such connections and air admitted through the air groove, thereby breaking down the vacuum and allowing the weight of milk to force open the flap 50 and to flow out into the flume or other receptacle. The downward movement of the compartment and its stop at the end of such movement, will tend to swing the flap outward and thereby assist in the discharge of the milk.

Upon the top of the casting 40 is mounted the slide valve block 51 (Fig. 7) that is arranged to move across the faces of the ports 27, 29 and 30 in the rocking movements of the casting. This block is formed on its inner face with the chamber 52 that is made of a length such as to extend over the central port 27 and either of the side ports, while the block is made of such a length that, when it is at one limit of its movement by which the central port is connected with the side port on that side, the other side port will be exposed to the atmosphere as shown in Fig. 1. Thus the reciprocal movements of the casting 40 will cause the ports and chambers 29 and 30 to be alternately connected with air and vacuum in reverse rotation to one another and thereby convey the desired pulsations through their respective connections 31 and 32. Should it be desired to pulsate only on one side, either of the connections 31 or 32 may be plugged.

To operate the casting 40 and the pulsator block 51 in the manner described, the casting is furnished with an arm 48 extending vertically up from it that is connected with any reciprocatory mechanism. The block 51 is connected to such arm by means of a pin 49 on its outer face that fits into an aperture in the arm.

I claim:—

1. In milking machine releasers, a fixed head or cover having the vacuum and milk connections passing through it and also the discharge aperture or apertures formed therein and a removable receiving vessel adapted to fit on to such head or cover and to make airtight connection therewith, substantially as herein specified.

2. In milking machine releasers, a fixed head or cover formed with a flange extending from its inner side and having the vacuum and milk connections passing through it, and a removable receiving vessel adapted to fit on to such head formed with an open end fitting within such flange and having a rim surrounding it engaging the edge of the flange and means whereby the receiving vessel may be held within the flange, substantially as herein specified.

3. In milking machine releasers of the class herein described and having reciprocally moving discharging vessels mounted upon a receiving vessel adapted in their movements to alternately connect with the receiving vessel and to open to the atmosphere, a pulsator apparatus combined with and operated by the movements of the discharging vessels and adapted to make operating connections for the teat cups alternately with the vacuum of the system and the atmosphere, substantially as described.

4. In milking machine releasers of the class herein described and having reciprocally moving discharging vessels mounted upon a receiving vessel, adapted in their movements to alternately connect with the receiving vessel and to open to the atmosphere, pulsator means comprising a portion of the receiving vessel having parts therein connected respectively with the vacuum system and with pipes leading to the teat cups, and a slide valve adapted to be connected to the discharging vessels and moved thereby over such ports to alternately connect the vacuum port with the air port and to uncover the air port, substantially as described herein.

5. In milking machine releasers of the class herein described, a fixed head or cover, a receiving vessel mounted therein, said head being provided with a slide valve face on its front and discharge ports opening from such vessel through the slide valve face one at each end thereof, a pair of ports arranged in regular communication with the vacuum system opening through such slide valve face and a pair of air grooves or apertures in such face, in combination with a pair of receiving vessels mounted to rock reciprocally across the slide valve face and each having a discharge opening covered by a hinged flap valve, each of such vessels having a port and an aperture in its wall adjacent to the slide valve face adapted to engage respectively with the corresponding discharge port and vacuum port in such face at one limit of its movement, and at the other limit of its movement for the port to be disconnected from the discharge port and the aperture to engage with the air groove or port in the slide valve face, such movements and connections being at the same time reversely made in the other discharging vessel, substantially as herein specified.

6. In a milking machine releaser of the class herein described and comprising a fixed head or cover, a receiving vessel mounted in such head or cover a slide valve face on the front of the head or cover and discharge chambers working in reciprocation upon the said slide valve face, pulsator means consisting in a portion of the slide valve face having a central chamber connected to the vacuum systems and opening through the front of the slide valve face and a side chamber on each or both sides of the central chamber also opening through the front of the slide valve face, a slide valve adapted to be mounted on the discharging vessels and move therewith, so positioned and constructed as to alternately connect the central chamber with the side chamber and to uncover the side chamber opening on each complete reciprocation of the discharging vessels, and a pipe connection leading away from the side chamber, substantially as herein described.

In testimony whereof, I have signed this specification in the presence of two subscribing witnesses.

THOMAS NOTON FLETCHER.

Witnesses:
E. THORPE SMITH,
ETHEL FRANCES COURTNEY.

Copies of this patent may be obtained for five cents each, by addressing the "Commissioner of Patents, Washington, D. C."